United States Patent
Smith et al.

(10) Patent No.: US 10,853,647 B2
(45) Date of Patent: Dec. 1, 2020

(54) ENVIRONMENTAL SAFETY NOTIFICATIONS IN VIRTUAL, AUGMENTED, AND MIXED REALITY (XR) APPLICATIONS

(71) Applicant: Dell Products, L.P., Round Rock, TX (US)

(72) Inventors: Hana Schuster Smith, Boulder, CO (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/033,307

(22) Filed: Jul. 12, 2018

(65) Prior Publication Data

US 2020/0019781 A1 Jan. 16, 2020

(51) Int. Cl.
| | |
|---|---|
| G06K 9/00 | (2006.01) |
| G06K 9/46 | (2006.01) |
| G06T 7/70 | (2017.01) |
| G06F 3/01 | (2006.01) |

(52) U.S. Cl.
CPC ......... *G06K 9/00671* (2013.01); *G06F 3/012* (2013.01); *G06F 3/013* (2013.01); *G06K 9/46* (2013.01); *G06T 7/70* (2017.01); *G06F 3/017* (2013.01); *G06T 2207/10048* (2013.01)

(58) Field of Classification Search
CPC ........ G06K 9/00671; G06K 9/46; G06T 7/70; G06F 3/012; G06F 3/013
USPC ....................................................... 345/633
See application file for complete search history.

(56) References Cited

U.S. PATENT DOCUMENTS

| | | | | |
|---|---|---|---|---|
| 2006/0112303 | A1* | 5/2006 | Levy .................. | G06F 11/1461 714/6.12 |
| 2009/0225001 | A1* | 9/2009 | Biocca ............... | G02B 27/0172 345/8 |
| 2013/0053063 | A1* | 2/2013 | McSheffrey ........ | H04W 64/006 455/456.1 |
| 2014/0098137 | A1* | 4/2014 | Fein ....................... | G06T 11/00 345/633 |
| 2016/0144505 | A1* | 5/2016 | Fong ...................... | B25J 9/1697 700/250 |

(Continued)

OTHER PUBLICATIONS

"IR Automation Guidebook: Temperature Monitoring and Control with IR Cameras," 2008, 68 pages, published by FLIR Systems Incorporated, available at https://pim-resources.coleparmer.com/data-sheet/flir-automation-thermal-guidebook.pdf.

(Continued)

*Primary Examiner* — Hai Tao Sun
(74) *Attorney, Agent, or Firm* — Fogarty LLP

(57) ABSTRACT

Systems and methods for providing environmental safety notifications in virtual, augmented, and mixed reality (xR) applications are described. In some embodiments, an Information Handling System (IHS) may include a host processor and a memory coupled to the host processor, the memory having program instructions stored thereon that, upon execution, cause the IHS to: receive an image from a Simultaneous Localization and Mapping (SLAM) camera configured to detect a location of a Head-Mounted Device (HMD) worn by a user during an xR application; identify a safety event based upon the image; and produce an xR object for display by the HMD, wherein the xR object indicates the safety event.

19 Claims, 7 Drawing Sheets

(56) References Cited

U.S. PATENT DOCUMENTS

2018/0239948 A1* 8/2018 Rutschman .......... G06K 9/0063

OTHER PUBLICATIONS

"DIY—Thermocam an Open-Source, Do-It-Yourself Thermal Imager," 2018, 16 pages, publisher GitHub, Inc., available at https://github.com/maxritter/DIY-Thermocam.

Matthew Terndrup, "Hands-on with DAQRI's New Industrial Augmented Reality Helmet," Feb. 27, 2015, 10 pages, available at https://www.roadtovr.com/hands-daqris-new-industrial-augmented-reality-helmet.

Hanhoon Park, et al., "Invisible Marker-Based Augmented Reality," International Journal of Human—Computer Interaction, Aug. 12, 2010, 7 pages, vol. 26, No. 9, Copyright © 2018 Informa UK Limited, Registered in England & Wales No. 3099067, London, UK.

S. Harishkumar, et al., "Detection of Hot Spots by Thermal Imaging to Protect Power Equipments," International Journal of Students Research in Technology & Management, Mar.-Apr. 2014, pp. 64-66, vol. 2 (02), ISSN 2321-2543, available at http://www.giapjournals.com/index.php/ijsrtm/article/viewFile/186/180.

"Detecting Electrical Hazards," Copyright © 2005-2018 Bust Mold Inc., 4 pages, available at : https://www.bustmold.com/resources/thermal-imaging/detecting-electrical-hazards/.

"Detecting Electrical Hazards with Electrical Thermal Imaging," © 2018 Heat Seeking, 3 pages, available at http://heatseekingthermalimaging.com/company-news/detecting-electrical-hazards-with-electrical-thermal-imaging/.

"Infrared Electrical Inspection Services—Detect system overloads, loose defective components and damaged switchgear. Infrared electrical testing finds hot, dangerous problems quickly," Copyright @ 2008-2018, Infrared Imaging Services LLC, 7 pages, available at http://www.infraredimagingservices.com/electrical-infrared.

"Standoff threat detection as part of a layered security strategy. Discriminating screening and analysis. Fast molecular chemical imaging of suspect materials, documents, and substances," Copyright © 2018 ChemImage Corporation, 5 pages, available at http://www.chemimage.com/markets/threat-detection/chemical/.

Atsuko Nakai, et al., "Instructional Information System using AR Technology for Chemical Plants," 2016, pp. 199-204, vol. 53, DOI: 10.3303/CET1653034, The Italian Association of Chemical Engineering, available at http://www.aidic.it/cet/16/53/034.pdf.

Cesar Bandera, "EDC Company Develops Augmented Reality System for HAZMAT Training," Aug. 15, 2017, 4 pages, available at https://news.njit.edu/edc-company-develops-augmented-reality-system-hazmat-training/.

Terrence Slonecker, et al., "Visible and Infrared Remote Imaging of Hazardous Waste: A Review," 2010, 35 pages, Remote Sensing, ISSN 2072-4292, available at https://pdfs.semanticscholar.org/f04c/o807d656a41acb28349189336bbe2535d539.pdf.

Mohd Shawal Jadin, et al., "Gas Leakage Detection Using Thermal Imaging Technique," 2014 UKSim-AMSS 16th International Conference on Computer Modeling and Simulation, Feb. 23, 2015, DOI: 10.1109/UKSim.2014.95, Publisher: IEEE, Cambridge, UK, available at http://ieeexplore.ieee.org/document/7046082/?reload=true.

Nahum Gat, et al., "Chemical Detection Using the Airborne Thermal Infrared Imaging Spectrometer (TIRIS)," Electro-Optical technology for Remote Chemical Detection and Identification II SPIE Conference 3082, Apr. 21 1997, 10 pages, available at http://citeseerx.ist.psu.edu/viewdoc/download?doi=10.1.1367.3118&rep=rep1&type=pdf.

Harry L. Osterman, et al., "Near-Infrared Fluorescence Imaging: Seeing Beyond the Visible with IRDye® Infrared Dyes," Seeing Beyond the Visible with IRDye® Infrared Dyes, pp. 1-18, LI-COR, available at https://www.icor.com/documents/kkkzpho630s4rgck244ydr4i1b1fo4qx.

* cited by examiner

ENVIRONMENTAL SAFETY NOTIFICATIONS IN VIRTUAL, AUGMENTED, AND MIXED REALITY (XR) APPLICATIONS

FIELD

The present disclosure generally relates to Information Handling Systems (IHSs), and, more particularly, to systems and methods for providing environmental safety notifications in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In modern applications, IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible.

In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In modern implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for providing environmental safety notifications in virtual, augmented, and mixed reality (xR) applications are described. In an illustrative, non-limiting embodiment, an Information Handling System (IHS) may include a host processor and a memory coupled to the host processor, the memory having program instructions stored thereon that, upon execution, cause the IHS to: receive an image from a Simultaneous Localization and Mapping (SLAM) camera configured to detect a location of a Head-Mounted Device (HMD) worn by a user during an xR application; identify a safety event based upon the image; and produce an xR object for display by the HMD, wherein the xR object indicates the safety event.

In some cases, the SLAM camera may include a visual spectrum camera, an infrared (IR) camera, or a near-IR (NIR) camera. Additionally, or alternatively, the SLAM camera may include an inside-out camera or an outside-in camera.

In various use-cases, a safety event may include a thermal hazard, an electrical hazard, or a chemical hazard. To identify the safety event, the program instructions may cause the IHS to extract a feature from a selected area of the image, and to identify the safety event at a physical location corresponding to the selected area in response to the feature indicating an anomaly. For example, the program instructions may cause the IHS to choose the selected area based upon the location of the HMD. Additionally, or alternatively, the program instructions may cause the IHS to choose the selected area based upon head orientation, eye tracking, or gaze tracking information of the user.

To produce the xR object, the program instructions may cause the xR object to be overlaid upon a physical object directly visible through the HMD at the physical location. Additionally, or alternatively, the program instructions may cause the IHS to decrease a visual emphasis of the xR object displayed by the HMD in response to the location of the HMD moving farther away from the physical object. The program instructions may cause the IHS to decrease a visual emphasis of the xR object displayed by the HMD in response to the location of the HMD moving closer to the physical object. Additionally, or alternatively, the program instructions may cause the IHS to increase a visual emphasis of the xR object displayed by the HMD in response to the location of the HMD moving farther away from the physical object. Additionally, or alternatively, the program instructions may cause the IHS to increase a visual emphasis of the xR object displayed by the HMD in response to the location of the HMD moving closer to the physical object. Additionally, or alternatively, the program instructions may cause the IHS to change the visual emphasis of the xR object displayed by the HMD in response to detection of a hand at a selected distance from the physical object.

The program instructions, upon execution, may cause the IHS to remove the xR object from the display in response to a request by the user. Additionally, or alternatively, the program instructions may cause the IHS to decrease or increase a visual emphasis of the xR object displayed by the HMD in response to the head orientation, eye tracking, or gaze tracking information indicating that the user is looking toward or away from the physical object.

In another illustrative, non-limiting embodiment, a method may include receiving an image from a SLAM camera configured to detect a location of an HMD worn by a user during an xR application; identifying a safety event based upon the image; and producing an xR object on a display of the HMD, where the xR object indicates the safety event. In yet another illustrative, non-limiting embodiment, a hardware memory device may have program instructions stored thereon that, upon execution by a hardware processor, cause the hardware processor to: receive an image from a SLAM camera configured to detect a location of an HMD worn by a user during an xR application; identify a safety event based upon the image; and render an xR object on a display of the HMD, where the xR object indicates the safety event.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
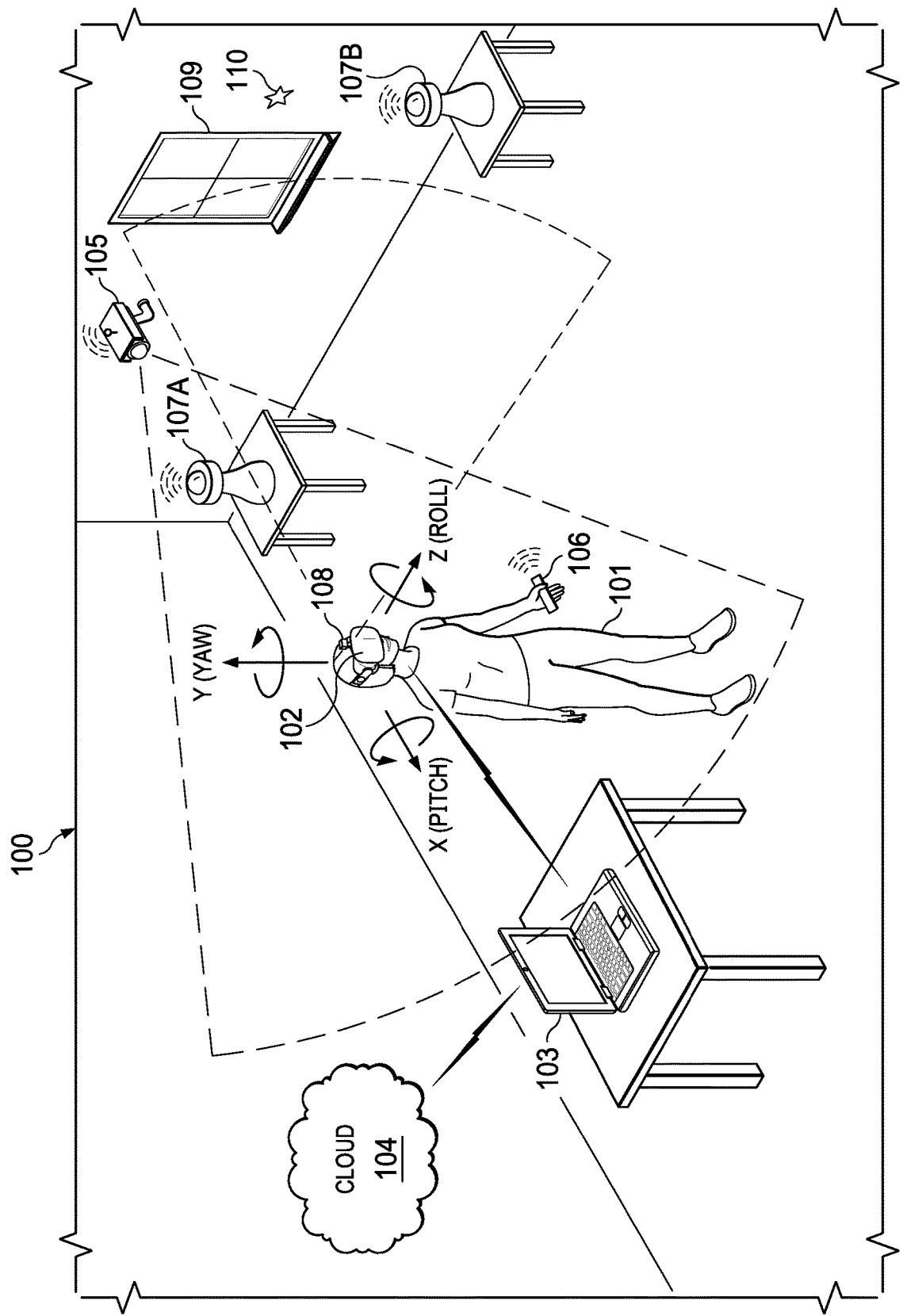
FIG. 1 is a perspective view of an example of a physical environment where a virtual, augmented, and mixed reality (xR) application is executed, according to some embodiments.

Embodiments described herein relate to systems and methods for providing environmental safety notifications in virtual, augmented, and mixed reality (xR) applications. These techniques are particularly useful in xR applications that employ head-mounted devices (HMDs), Heads-Up Displays (HUDs), and eyeglasses—collectively referred to as "HMDs."

HMDs are starting to become pervasive in many applications, including, but not limited to: factory, industrial, and first responders. Many of these applications take place in physical spaces where one or more environmental safety events can occur, and which can present a potential or actual safety concern to the wearer of the HMD and/or to others.

For example, certain areas of an environment may get much hotter than the ambient temperature (e.g., "hot spots"), and may cause injury to an HMD wearer who inadvertently touches them. These thermal hazards may be planned or known beforehand (e.g., a heat sink), or unplanned and discoverable (e.g., wear and tear makes in a particular spot insulation ineffective over time, and the spot becomes hotter than expected). Electrical hazards may also be planned or known (e.g., a high voltage circuit) or unplanned and discoverable (e.g., a current leak or an open wire). Similarly, a designated chemical reagent mixing area may constitute a planned chemical hazard location, whereas a spill zone may present an unplanned hazard. Additionally, or alternatively, in agricultural applications, unplanned hazards may include food contamination in portions of a plantation field or on in areas of an industrial kitchen (e.g., using infrared dyes).

To address these and other safety concerns, in various embodiments, systems and methods described herein may provide notification of environmental hazards in an HMD, detected by using a near-infrared (NIR) SLAM camera, for example, and then produce corresponding warning overlays, as xR objects to be displayed by the HMD's field-of-view (FOV), in steady state. These systems and methods may employ safety threshold values (e.g., temperature gradients) and/or custom warning icons or images, which may be set as part of a calibration operation. Additionally, or alternatively, these systems and methods may use eye gaze tracking to localize a region-of-gaze-interest (ROGI) for hazard detection and/or notification (areas smaller than an entire FOV or frame).

In some embodiments, a service implemented via a host Information Handling System (IHS), tethered or coupled to an HMD, may include a calibration operation that allows the user to set up custom temperature gradient, chemical concentration thresholds, or values for different levels of warnings, and also allow the user to associate a selected warning icon or image with each different level of warning and/or hazard priority. In certain implementations, there may be a default set of levels, enabled detection features, and warning icons set by default. The user may be given the option of turning on/off the warnings, and also turning on/off warnings of entire frame versus just region of gaze interest, in a User Interface (UI) menu, for example, to preserve processor or memory resources.

In other embodiments, a service implemented via a host IHS may perform steady state analysis operations on captured NIR camera frames. Using eye tracking data, the service may overlay an xR object, icon, image, or warning label that is particularly sized to the danger region, for example, as a configurable window. Detection of thermal, electrical, and chemical hazards may be performed using invisible IR markers for planned hazards, and/or using NIR imaging for hazards that are unplanned.

In yet other embodiments, systems and methods described herein may provide an analysis and HMD notification service that processes outputs from NIR SLAM cameras on a host IHS, in many cases without requiring extra hardware (e.g., without dedicated thermal sensors). These systems and methods may further provide improved resource usage on the host IHS by analyzing only a ROGI, as opposed to the entire frame of IR data, and may adaptively turn off aspects of the service based on host resource loads, for example, for prioritization against other host IHS processes FIG. 1 is a perspective view of an example of physical environment 100 where an xR application is executed. In various embodiments, user 101 may wear HMD 102 around their heads and over their eyes, during execution of an xR application. An xR application may include a subset of components or objects executed by HMD 102 and another subset of components or objects executed by host IHS 103.

HMD 102 may be tethered to host IHS 103 via a wired or wireless connection. Particularly, host IHS 103 may be used to generate digital images to be displayed by HMD 102. HMD 102 transmits information to host IHS 103 regarding the state of user 101 (e.g., physical position, head orientation, gaze focus, etc.), which in turn enables host IHS 103 to determine which image or frame to show to the user next, and from which perspective.

For instance, as user 101 moves about environment 100, any change in: (i) physical location (e.g., x, y, and z) or translation; or (ii) orientation (e.g., pitch, yaw, and roll) or rotation, may cause host IHS 103 to effect a corresponding change in the picture or symbols displayed to user 101 via HMD 102. These changes may be detected by HMD 102 and processed by host IHS 103, for example, to maintain congruence with the outside world and/or to allow user 101 to look around a consistent virtual reality environment.

In some implementations, host IHS 103 may execute a runtime or rendering engine, such as UNITY, UNREAL, AUTODESK, etc., which produces a visual xR model displayed by HMD 102 from a unique point-of-view, based upon the location, pose, and/or gaze of user 101—which may be determined, at least in part, using Simultaneous Location and Mapping (SLAM).

As used herein, the term SLAM refers systems and methods that use positional tracking devices to construct a map of an unknown environment where an HMD is located, and that simultaneously identifies where the HMD is located, its orientation, and/or pose.

Generally, SLAM methods implemented in connection with xR applications may include a propagation component, a feature extraction component, a mapping component, and an update component. The propagation component may receive angular velocity and accelerometer data from an Inertial Measurement Unit (IMU) built into the HMD, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as the HMD moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors. And, in many embodiments, each different SLAM method may use a different positional tracking source or device. For example, wireless tracking may use a set of anchors or lighthouses 107A-B that are placed around the perimeter of environment 100 and/or one or more tokens 106 or tags 110 that are tracked; such that HMD 102 triangulates its position and/or state using those elements.

Inertial tracking may use data from accelerometers and gyroscopes within HMD 102 to find a velocity and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera (IR covers a portion of the electromagnetic spectrum from approximately 0.9 µm to 14 µm). With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100.

In various embodiments, data obtained from a positional tracking system and technique employed by HMD 102 may be received by host IHS 103, which in turn executes the SLAM method of an xR application. In the case of an inside-out SLAM method, for example, an xR application receives the position and orientation information from HMD 102, determines the position of features extracted from the images captured by camera 108, and corrects the localization of landmarks in space using comparisons and predictions.

An estimator, such as an Extended Kalman filter (EKF) or the like, may be used for handling the propagation component of an inside-out SLAM method. In some cases, a map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100 may be obtained, at least in part, from cloud 104.

In some cases, an IR or NIR SLAM camera may be further configured to capture thermographic images of target objects, and to provide accurate non-contact temperature measurements of those objects.

Figure 2:
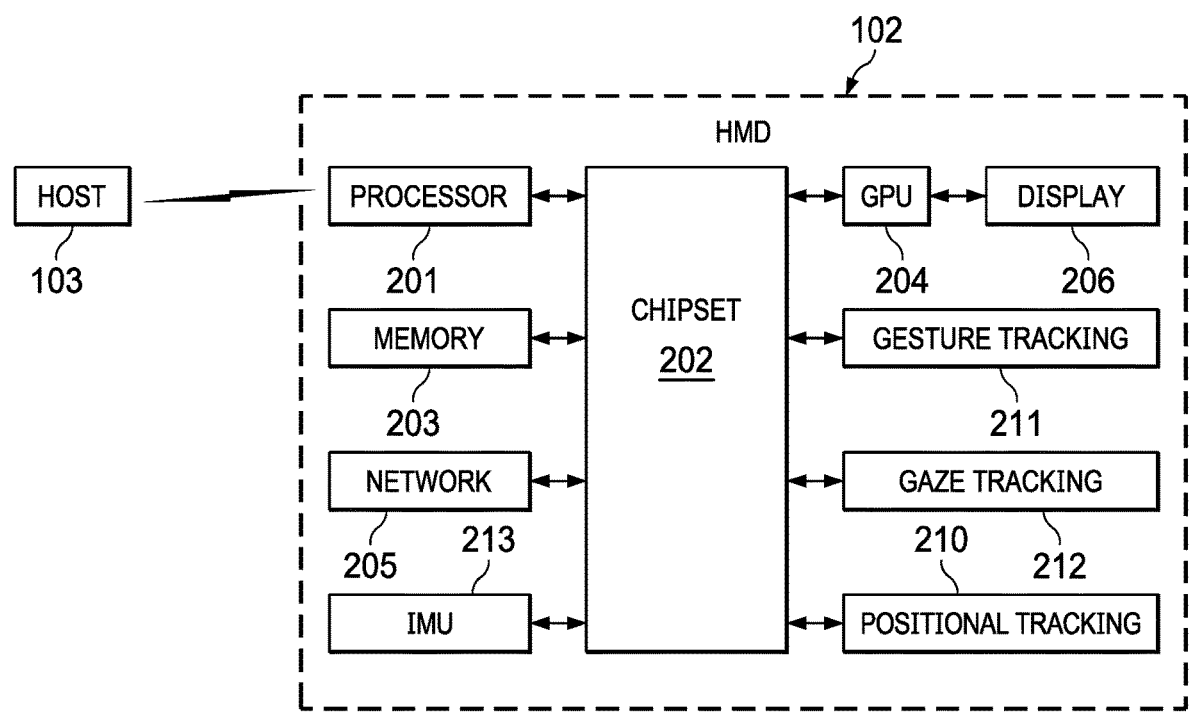
FIG. 2 is a block diagram of an example of a Head-Mounted Display (HMD) and a host Information Handling System (IHS), according to some embodiments.

FIG. 2 is a block diagram of an example HMD 102 and host IHS 103, according to some embodiments. As depicted, HMD 102 includes components configured to display an all-immersive virtual environment and/or to overlay digitally-created content or images on a display, panel, or surface (e.g., an LCD panel, an OLED film, a projection surface, etc.), in place of and/or in addition to the user's natural visual perception of the real-world.

As shown, HMD 102 includes processor 201. In various embodiments, HMD 102 may be a single-processor system, or a multi-processor system including two or more processors. Processor 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

HMD 102 includes chipset 202 coupled to processor 201. In certain embodiments, chipset 202 may utilize a Quick-Path Interconnect (QPI) bus to communicate with processor 201. In various embodiments, chipset 202 provides processor 201 with access to a number of resources. For example, chipset 202 may be coupled to network interface 205 to enable communications via various wired and/or wireless networks.

Chipset 202 may also be coupled to display controller or graphics processor (GPU) 204 via a graphics bus, such as an Accelerated Graphics Port (AGP) or Peripheral Component Interconnect Express (PCIe) bus. As shown, graphics processor 204 provides video or display signals to display 206.

Chipset 202 further provides processor 201 and/or GPU 204 with access to memory 203. In various embodiments, memory 203 may be implemented using any suitable memory technology, such as static RAM (SRAM), dynamic RAM (DRAM) or magnetic disks, or any nonvolatile/Flash-type memory, such as a solid-state drive (SSD) or the like. Memory 203 may store program instructions that, upon execution by processor 201 and/or GPU 204, present an xR application to user 101 wearing HMD 102.

Other resources coupled to processor 201 through chipset 202 may include, but are not limited to: positional tracking system 210, gesture tracking system 211, gaze tracking system 212, and inertial measurement unit (IMU) system 213.

Positional tracking system 210 may include one or more optical sensors (e.g., a camera 108) configured to determine how HMD 102 moves in relation to environment 100. For example, an inside-out tracking system 210 may be configured to implement tracking techniques that use distinctive visual characteristics of the physical environment to identify specific images or shapes which are then usable to calculate HMD 102's position and orientation.

Gesture tracking system 211 may include one or more cameras or optical sensors that enable user 101 to use their actual hands for interaction with objects rendered by HMD 102. For example, gesture tracking system 211 may be configured to implement hand tracking and gesture recognition in a 3D-space via a user-facing 2D camera. In some cases, gesture tracking system 211 may track a selectable number of degrees-of-freedom (DOF) of motion, with depth information, to recognize dynamic hand gestures (e.g., swipes, clicking, tapping, grab and release, etc.) usable to control or otherwise interact with xR applications executed by HMD 102.

Gaze tracking system 212 may include an inward-facing projector configured to create a pattern of infrared or (near-infrared) light on the user's eyes, and an inward-facing camera configured to take high-frame-rate images of the eyes and their reflection patterns; which are then used to calculate the user's eye's position and gaze point. In some cases, gaze detection or tracking system 212 may be configured to identify a direction, extent, and/or speed of movement of the user's eyes in real-time, during execution of an xR application (e.g., a gaze vector). In addition, gaze detection or tracking system 212 may be configured to calculate a ROGI, of configurable size or shape (e.g., rectangular), based in part upon a gaze vector obtained using eye/gaze tracking (EGT) processing.

IMU system 213 may include one or more accelerometers and gyroscopes configured to measure and report a specific force and/or angular rate of the user's head. In some cases, IMU system 212 may be configured to a detect a direction, extent, and/or speed of rotation (e.g., an angular speed) of the user's head in real-time, during execution of an xR application.

In some implementations, HMD 102 may communicate with host IHS 103 via wired or wireless connections (e.g., WiGig, WiFi, etc.). For example, if host IHS 103 has more processing power and/or better battery life than HMD 102, host IHS 103 may be used to offload some of the processing involved in the creation of the xR experience. In some cases, host IHS 103 may be built into (or otherwise coupled to) a backpack or vest, wearable by user 101.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

In various embodiments, HMD 102 and/or host IHS 103 may not include each of the components shown in FIG. 2. Additionally, or alternatively, HMD 102 and/or host IHS 103 may include components in addition to those shown in FIG. 2. Furthermore, components represented as discrete entities in FIG. 2 may, in some embodiments, be integrated with other components. In various implementations, all or a portion of the functionality provided by the illustrated components may be provided by components integrated as a System-On-Chip (SOC), or the like.

Figure 3:
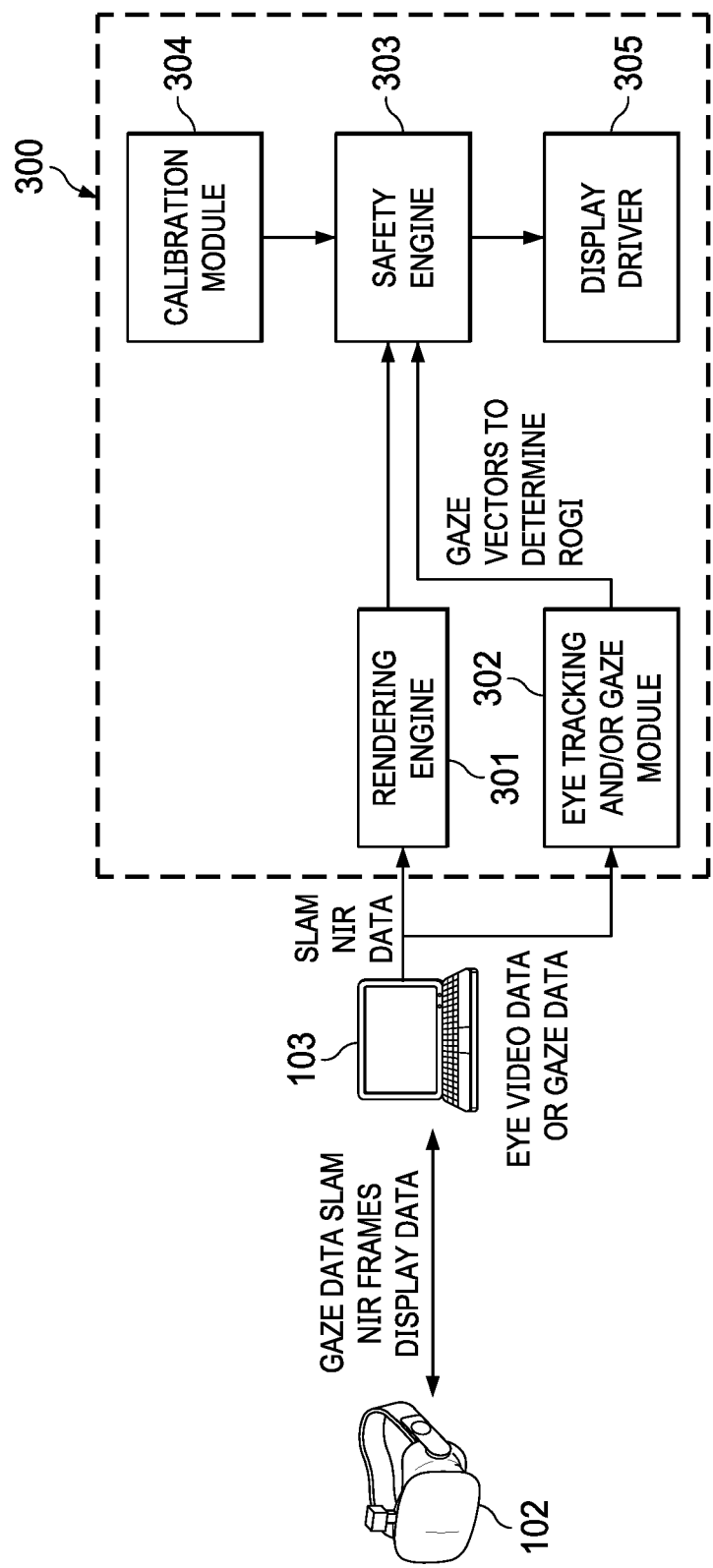
FIG. 3 is a block diagram of an example of a system for calibration, analysis, and notification of environmental safety events in xR applications, according to some embodiments.

FIG. 3 is a block diagram of an example of system 300 for calibration, analysis, and notification of environmental safety events in xR applications. In various embodiments, system 300 may include program instructions stored in a memory device (e.g., a system memory) that, upon execution, cause a host IHS to perform a number of operations, described in more detail below. As shown, system 300 may include rendering engine 301, eye tracking and/or gaze detection module 302, safety module 303, calibration module 304, and display driver 305.

In operation, HMD 102 detects eye or gaze tracking information (e.g., using component 212) and transmits that data to host IHS 103. In response to the processing of SLAM NIR data by system 300, host IHS 103 provides HMD 102 with display frames that also include environmental safety notifications, or the like.

Particularly, as part of the processing performed by system 300, rendering engine 301 receives NIR frames/data from a SLAM camera, such as may be disposed in a selected one of lighthouses 107. Then, using the NIR frames/data, rendering engine 301 generates digital images to be displayed by HMD 102, and from which perspective, based upon the user's current state, and provides those images to safety engine 303. Meanwhile, eye tracking and/or gaze module 302 receives eye video data and/or gaze data detected via HMD 102.

Safety engine 303 detects one or more safety events based upon the output of rendering engine 301 (and/or the NIR frames/data), using information stored in calibration module 304. In various embodiments, calibration module 304 may include temperature values, electrical voltage and current values, chemical concentration amounts, etc. that can be used to determine, in a particular context, the presence of a safety event. For example, calibration module 304 may store a threshold temperature (e.g., above 45 degrees Celsius) above which a thermal hazard safety event may be recognized using NIR imaging.

In some cases, calibration module 304 may also include one or more parameters or settings usable by safety engine 303 to determine, for example, whether to analyze entire NIR frames or smaller ROGIs, based on the output of module 302. Additionally, or alternatively, calibration module 304 may include one or more parameters or settings usable by safety engine 303 to determine whether to scale safety event processing up or down (e.g., to increase or decrease the size of a ROGI, or to process an entire frame) based on current system demands.

Additionally, or alternatively, calibration module 304 may include one or more parameters or settings usable by safety engine 303 to determine whether to switch input frames or data from a first SLAM device (e.g., a first NIR camera) to a second SLAM device (e.g., a second NIR camera). Additionally, or alternatively, calibration module 304 may include one or more parameters or settings usable by safety engine 303 to determine what behavior to apply to an icon or warning, as user 101 moves around environment 100, depending upon the xR application.

Figure 4:
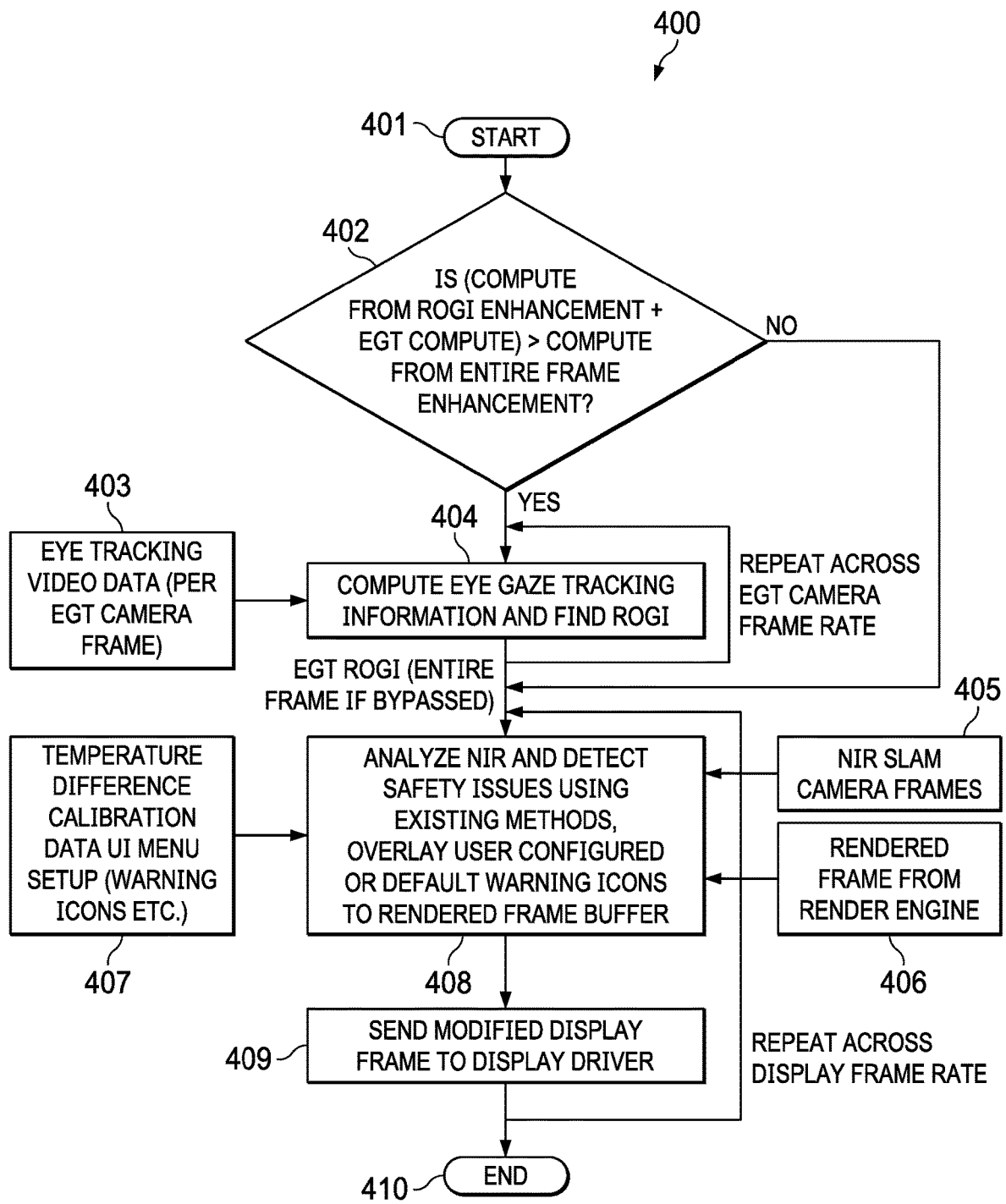
FIG. 4 is a flowchart of an example of a method for calibration, analysis, and notification of environmental safety events in xR applications, according to some embodiments.

FIG. 4 is a flowchart of an example of method 400 for calibration, analysis, and notification of environmental safety events in xR applications. In some embodiments, method 400 may be performed, at least in part, through the operation of system 300 of FIG. 3 by host IHS 103 with cooperation from HMD 102 and/or one or more SLAM sources.

Method 400 begins at block 401. At block 402, method 400 determines whether the compute load of a ROGI analysis, using EGT processing, would be greater than the compute load for an entire NIR SLAM frame. If so, block 404 receives eye tracking video data from block 403 and computes EGT to select the ROGI; otherwise, method 400 skips block 404.

In some cases, block 402 may also determine whether to scale safety event processing down based on current system demands, for example, to enable only pre-selected types of hazard notification (e.g., for emergencies or high-priority alerts only), to the exclusion of other types of hazards, in response to an increase in SLAM, gesture recognition, rendering, or other processing and memory usage on host IHS 103. Additionally, or alternatively, block 402 may determine whether to switch input frames or data from a first SLAM device to a second SLAM device, for instance, in response to a determination that the second SLAM device is physically closer to the location of environmental hazard than the first SLAM device, even if the HMD is closest to and/or being actively located using data obtained from, the first SLAM device.

At block 408, method 400 receives NIR SLAM camera frames 405 and/or rendered frames from rendering engine 301. Block 408 may also receive temperatures, voltages, currents, concentrations, and other threshold amounts or values from calibration module 304, which are indicative of safety events. Moreover, block 408 may further receive UI settings from calibration module 304 to associate selected dynamic visual behaviors to particular types of safety events or types of events.

In some xR applications that require directing the user's attention toward the hazard (e.g., first responder), in response to user 101 directing his or her ROGI away from a hazard (or walking away from the hazard), a notification associated with the hazard may be visually emphasized (e.g., made larger, brighter, and/or more centered on the HMD's display), to draw the user's attention to the safety event. In other applications, in response to user 101 directing his or her ROGI away from a hazard (or walking away from the hazard), a notification associated with the hazard may be visually deemphasized (e.g., made smaller, dimmer, and/or peripherally located on the HMD's display).

Block 408 analyzes NIR frames/data from a selected SLAM source, detects safety events (e.g., temperature, voltage, or particle concentrations outside of a specified range) at identified locations in environment 100, and overlays warning images on a display frame buffer. Block 409 sends the modified display frame buffer data to display driver 305, for display by HMD 102 during execution of the xR application, before method 400 ends at block 410.

Figure 5:
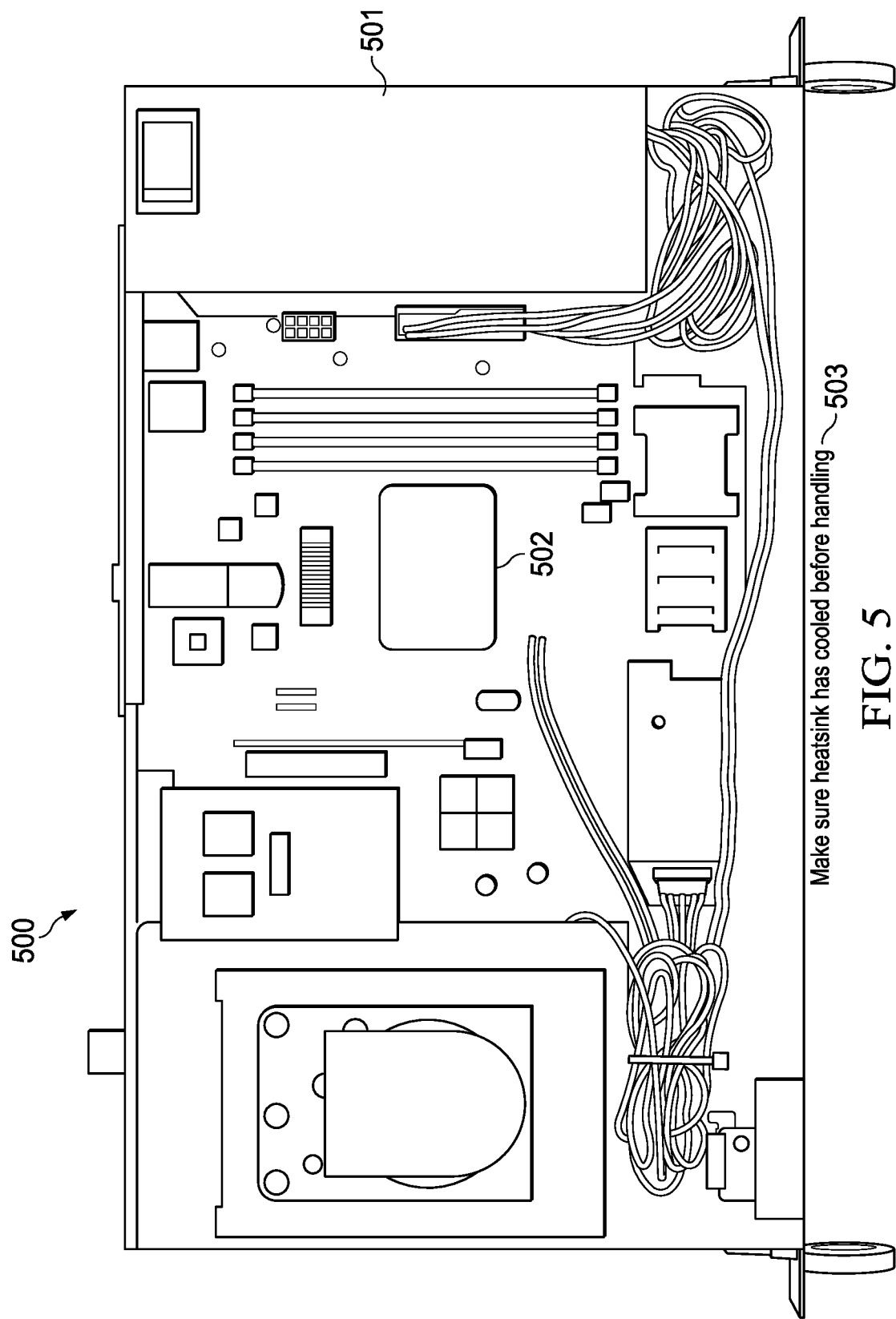
FIGS. 5-7 are screenshots of xR displays showing various example use-cases, according to some embodiments.

FIG. 5 shows screenshot 500 of an xR display within HMD 102, executing an xR application. Particularly, real-world electronic component 501 is directly visible through the HMD's display, with elements 502 and 503 projected onto the display as xR objects (e.g., digital images). In this case, overlay 502 includes a highlighted portion and an icon, covering an underlying physical component 501, at a location where NIR SLAM frames indicate that a temperature threshold has been reached. Legend 503 ("Make sure heat-sink has cooled before handling) may be provided on the display to instruct the user about how to handle the detected thermal hazard.

The color, size, and transparency of element 502 may be selected in response to the gravity of the hazard (e.g., if a component is up to 10° C. above safe temperatures, use yellow overlay; if more than 10° C., use red overlay and blinking icon). In some cases, elements 502/503 may be displayed in response to detection of any safety threshold violation; in other cases, elements 502/503 may be displayed only in response to a user's hand moving toward the hot spot, which may be determined using gesture tracking system 211.

In the latter scenario, if user's hands disappear from the gesture recognition camera's FOV, elements 502/503 may be removed. In other cases, however, the opposite notification behavior may be selected, such that elements 502/503 may be removed, or dismissed, in response to a user's hand moving toward the hot spot (e.g., to automatically de-obfuscate the hot spot's location once the wearer's attention to the safety event has been captured, in the case of a first responder application).

Figure 6:
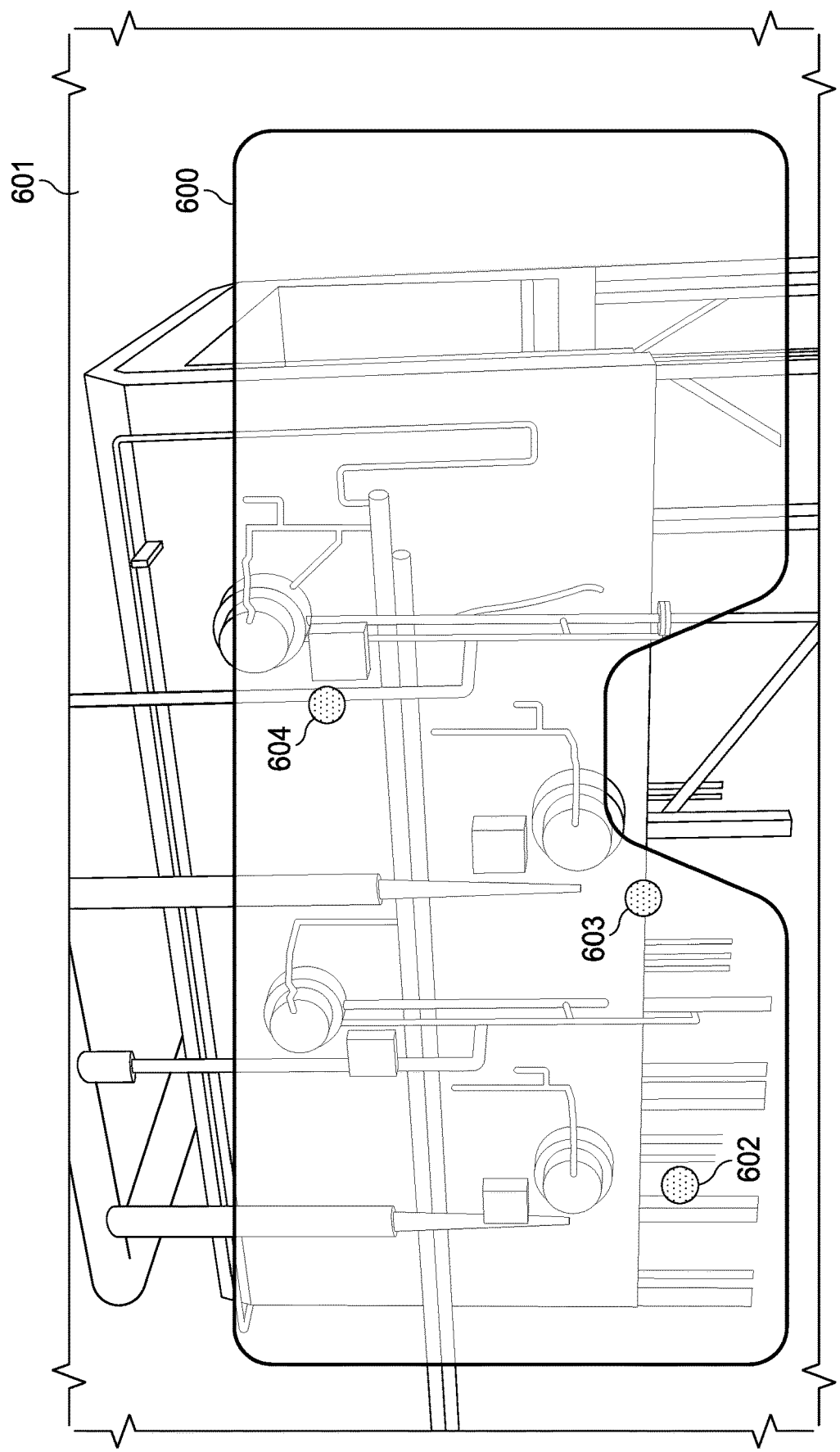

FIG. 6 shows screenshot 600 of an xR display within HMD 102, executing another xR application. Particularly, real-world oil production plant 601 includes a plurality of pipes and valves that are directly visible through the HMD's display 600, with elements 602 and 603 projected onto the display as xR objects (e.g., digital images).

In this case, real-world object 604 does not have an associated overlay, because it has not been detected as presenting a thermal or chemical hazard. Additionally, or alternatively, object 604 may not have an associated overlay, even in the presence of a chemical or thermal hazard, in response to the user's ROGI being directed away from it. Additionally, or alternatively, object 604 may not have an associated overlay, despite the presence of a chemical or thermal hazard, in response to the SLAM system determining that the location of object 604 is out of the user's arm's reach (e.g., estimated using a depth camera, or the like).

Additionally, or alternatively, object 604 may not have the associated overlay, after the presence of a chemical or thermal hazard has been detected, in response to the SLAM system determining that the user is moving away from object 604 (e.g., once the xR Application's goal of warning the user has been reached). Additionally, or alternatively, object 604 may not have the associated overlay, after the presence of a chemical or thermal hazard has been detected, in response to the SLAM system determining that the user is moving toward from object 604 (e.g., the xR application's goal of attracting the user's attention has been reached).

Overlay 602, in this case, shows a first color and/or icon (e.g., a yellow color and an attention icon) at the location of a first valve; whereas overlay 603 shows a second color and/or icon. User notifications may be associated with a severity to indicate how actionable the user reaction should be, and the severity may be based on configurable thresholds.

For example, a critical notification (e.g., a red "X" circle icon) may indicate that immediate action should be taken to avoid danger. For example, in a manufacturing context, a critical notification may indicate that a hot surface may result in severe burns; whereas in an enterprise, it may indicate data loss or down servers. A warning notification (e.g., a yellow '!' triangle icon) may indicate that a threshold has been reached and treading towards critical. For example, in the manufacturing context, a warning notification may indicate extended exposure may lead to injury; whereas in an enterprise, it may indicate that a disk is almost out of space and backups may soon start failing. Meanwhile, an informational notification (e.g., a blue 'i' icon) may be provided when no action required.

In some cases, any of the aforementioned notifications may include a word label with the icon. Additionally, or alternatively, in overlays only icons may be use so as to not obscure other visuals, and to make it possible provide mouse details.

In some embodiments, each different type of overlay may be used to indicate a different type of safety event and/or the gravity of the safety event. For example, overlay 602 may be used for thermal hazards, and overlay 603 may be used for chemical hazards. Additionally, or alternatively, overlay 602 may be used when a local temperature reaches a first threshold, and overlay 603 may be used when a local temperature reaches a second threshold.

In some cases, overlays 602 and/or 603 may be selected and/or dismissed affirmatively by the user (e.g., using a voice or gesture interface). Additionally, or alternatively, overlays 602 and/or 603 may be dismissed when a safety event is no longer detected at the identified location. Additionally, or alternatively, overlays 602 and/or 603 may be automatically and dynamically modified (e.g., size, color, transparency, position, etc.) in response to the user's changing movement and gaze, and detected by HMD 102. In some cases, these notification behavior settings may be retrieved as user preferences from calibration module 304.

Figure 7:
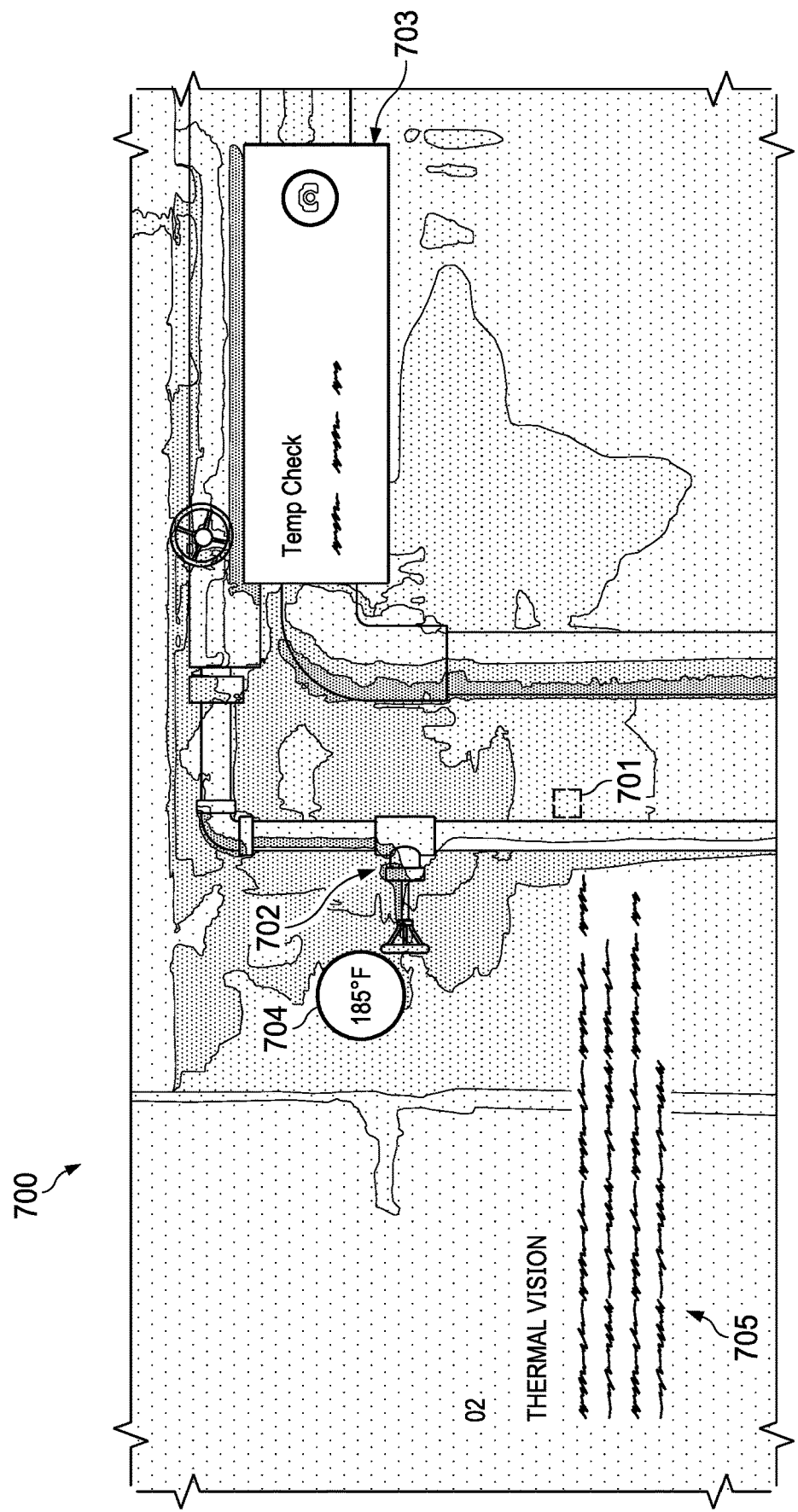

FIG. 7 shows screenshot 700 of an xR display within HMD 102, executing yet another xR application. Particularly, another real-world oil production plant has valve 702 directly visible through the HMD's display 700, with elements 703-705 projected onto the display as xR objects (e.g., digital images).

In this implementation, the user is gazing at point 701, such that a distance between valve 702 and gaze point 701 may be ascertained, for example, by host IHS 103 using one or more SLAM techniques. In response to the distance being smaller than a threshold value, such that it places valve 702 within the user's current ROGI (smaller than the entire FOV), overlay icon 704 may be rendered next to valve 702 to indicate a first amount of information regarding the detected safety hazard. Overlay windows 703 and 705 may be rendered at pre-selected locations of display 700 to provide a second amount of information to the user regarding an ongoing temperature check process.

In sum, systems and methods described herein may make use of NIR imaging detection and analysis methods, on HMD's SLAM NIR camera data, processed on the host IHS to then detect and overlay warning hazards as virtual objects on either entire FOV or ROGI display frames, and to notify the user through virtual hazard notification icon overlay on the HMD's FOV, of safety hazards in environment that are either known or unplanned.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a host processor; and
a memory coupled to the host processor, the memory having program instructions stored thereon that, upon execution, cause the IHS to:
receive an image from a Simultaneous Localization and Mapping (SLAM) camera configured to detect a location of a Head-Mounted Device (HMD) worn by a user during a virtual, augmented, or mixed reality (xR) application;
identify a safety event in a danger region based upon the image;
produce an xR object for display by the HMD, wherein the xR object: (i) overlays the danger region, and (ii) indicates the safety event; and
reduce a visual emphasis of the xR object in response to detection of a hand moving with respect to the danger region.

2. The IHS of claim 1, wherein the SLAM camera comprises a visual spectrum camera, an infrared (IR) camera, or a near-IR (NIR) camera.

3. The IHS of claim 1, wherein the SLAM camera comprises an inside-out camera or an outside-in camera.

4. The IHS of claim 1, wherein the safety event comprises a thermal hazard, an electrical hazard, or a chemical hazard.

5. The IHS of claim 1, wherein to identify the safety event, the program instructions, upon execution, further cause the IHS to extract a feature from a selected area of the image, and to identify the safety event at the danger region in response to the feature indicating an anomaly.

6. The IHS of claim 1, wherein to produce the xR object, the program instructions, upon execution, further cause the IHS to determine that a hazard notification associated with the safety event is enabled.

7. The IHS of claim 1, wherein the safety event comprises a disk out of space, and wherein the xR object indicates that backups are subject to failure.

8. The IHS of claim 1, wherein the program instructions, upon execution, further cause the IHS to decrease the visual emphasis of the xR object in response to the location of the HMD moving farther away from the danger region.

9. The IHS of claim 1, wherein the program instructions, upon execution, further cause the IHS to decrease the visual emphasis of the xR object in response to the location of the HMD moving closer to the danger region.

10. The IHS of claim 1, wherein the program instructions, upon execution, further cause the IHS to increase the visual emphasis of the xR object in response to the location of the HMD moving farther away from the danger region.

11. The IHS of claim 1, wherein the program instructions, upon execution, further cause the IHS to increase the visual emphasis of the xR object in response to the location of the HMD moving closer to the danger region.

12. The IHS of claim 1, wherein the program instructions, upon execution, further cause the IHS to remove the xR object from the display in response to a request by the user.

13. The IHS of claim 5, wherein the program instructions, upon execution, further cause the IHS to choose the danger region based upon head orientation, eye tracking, or gaze tracking information of the user.

14. The IHS of claim 13, wherein the program instructions, upon execution, further cause the IHS to decrease the visual emphasis of the xR object in response to the head orientation, eye tracking, or gaze tracking information indicating that the user is looking away from the danger region.

15. The IHS of claim 13, wherein the program instructions, upon execution, further cause the IHS to decrease the visual emphasis of the xR object in response to the head orientation, eye tracking, or gaze tracking information indicating that the user is looking toward the danger region.

16. The IHS of claim 13, wherein the program instructions, upon execution, further cause the IHS to increase the visual emphasis of the xR object in response to the head orientation, eye tracking, or gaze tracking information indicating that the user is looking away from the danger region.

17. The IHS of claim 13, wherein the program instructions, upon execution, further cause the IHS to increase the visual emphasis of the xR object in response to the head orientation, eye tracking, or gaze tracking information indicating that the user is looking toward the danger region.

18. A method, comprising:
receiving an image from a Simultaneous Localization and Mapping (SLAM) camera configured to detect a location of a Head-Mounted Device (HMD) worn by a user during a virtual, augmented, or mixed reality (xR) application;
identifying a safety event in a danger region based upon the image;
producing an xR object on a display of the HMD, wherein the xR object: (i) overlays the danger region, and (ii) indicates the safety event; and
reducing a visual emphasis of the xR object in response to detection of a hand moving toward the danger region.

19. A hardware memory device having program instructions stored thereon that, upon execution by a hardware processor, cause the hardware processor to:
receive an image from a Simultaneous Localization and Mapping (SLAM) camera configured to detect a location of a Head-Mounted Device (HMD) worn by a user during a virtual, augmented, or mixed reality (xR) application;
identify a safety event in a danger region based upon the image;
render an xR object on a display of the HMD, wherein the xR object: (i) overlays the danger region, and (ii) indicates the safety event; and
reducing a visual emphasis of the xR object in response to detection of a hand moving away from the danger region.

* * * * *